(12) United States Patent
Hecht et al.

(10) Patent No.: US 10,261,306 B2
(45) Date of Patent: Apr. 16, 2019

(54) METHOD TO BE CARRIED OUT WHEN OPERATING A MICROSCOPE AND MICROSCOPE

(71) Applicant: LEICA MICROSYSTEMS CMS GMBH, Wetzlar (DE)

(72) Inventors: Frank Hecht, Mannheim (DE); Frank Sieckmann, Bochum (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 1007 days.

(21) Appl. No.: 14/398,513

(22) PCT Filed: Apr. 19, 2013

(86) PCT No.: PCT/EP2013/058179
§ 371 (c)(1),
(2) Date: Nov. 3, 2014

(87) PCT Pub. No.: WO2013/164208
PCT Pub. Date: Nov. 7, 2013

(65) Prior Publication Data
US 2015/0143274 A1 May 21, 2015

(30) Foreign Application Priority Data
May 2, 2012 (DE) .......................... 10 2012 009 257

(51) Int. Cl.
*G02B 21/00* (2006.01)
*G02B 21/36* (2006.01)
(Continued)

(52) U.S. Cl.
CPC ......... *G02B 21/367* (2013.01); *G02B 21/008* (2013.01); *G02B 21/36* (2013.01);
(Continued)

(58) Field of Classification Search
CPC .... G02B 21/367; G02B 21/008; G02B 21/36; G06F 3/04815; G06F 3/04845; G06F 3/04847; G06F 3/04883
See application file for complete search history.

(56) References Cited

U.S. PATENT DOCUMENTS 9,258,550 B1 * 2/2016 Sieracki ................. G01B 11/24
2002/0158966 A1 10/2002 Olschewski et al.
(Continued)

FOREIGN PATENT DOCUMENTS

| AL | WO 02052393 A1 | 7/2002 |
|---|---|---|
| EP | 1235049 A2 | 8/2002 |
| WO | WO 03036566 A2 | 5/2003 |

OTHER PUBLICATIONS

"3D Reconstructions of Sources", Living Image Software—User's Manual, Version 3.2., Jan. 1, 2009, pp. 164-189.

*Primary Examiner* — Eric L Bolda
(74) *Attorney, Agent, or Firm* — Leydig, Voit & Mayer, Ltd.

(57) ABSTRACT

A method for execution upon operation of a microscope or for depiction of an object, or a part thereof, imaged with the microscope includes depicting a proxy of the object on a display of the microscope or on a further display. At least one manipulation is performed on the proxy, or on the depiction of the proxy, using an input means. At least one depiction parameter for the depiction of the object or of the part of the object, or at least one microscope control parameter, is derived from the manipulation. The object or the part of the object is depicted in consideration of the derived depiction parameter or of the derived microscope control parameter.

26 Claims, 12 Drawing Sheets

(51) Int. Cl.
  *G06F 3/0481* (2013.01)
  *G06F 3/0484* (2013.01)
  *G06F 3/0488* (2013.01)

(52) U.S. Cl.
  CPC ...... *G06F 3/04815* (2013.01); *G06F 3/04845* (2013.01); *G06F 3/04847* (2013.01); *G06F 3/04883* (2013.01)

(56) References Cited

U.S. PATENT DOCUMENTS

| | | |
|---|---|---|
| 2004/0257360 A1 | 12/2004 | Sieckmann |
| 2006/0173268 A1 | 8/2006 | Mullick et al. |
| 2009/0208143 A1* | 8/2009 | Yoon .................. A61B 1/0058 382/321 |
| 2010/0053159 A1* | 3/2010 | Visser .................. G06T 15/08 345/424 |
| 2011/0141103 A1 | 6/2011 | Cohen et al. |
| 2013/0106888 A1* | 5/2013 | Penner .................. G06F 3/0484 345/582 |

\* cited by examiner

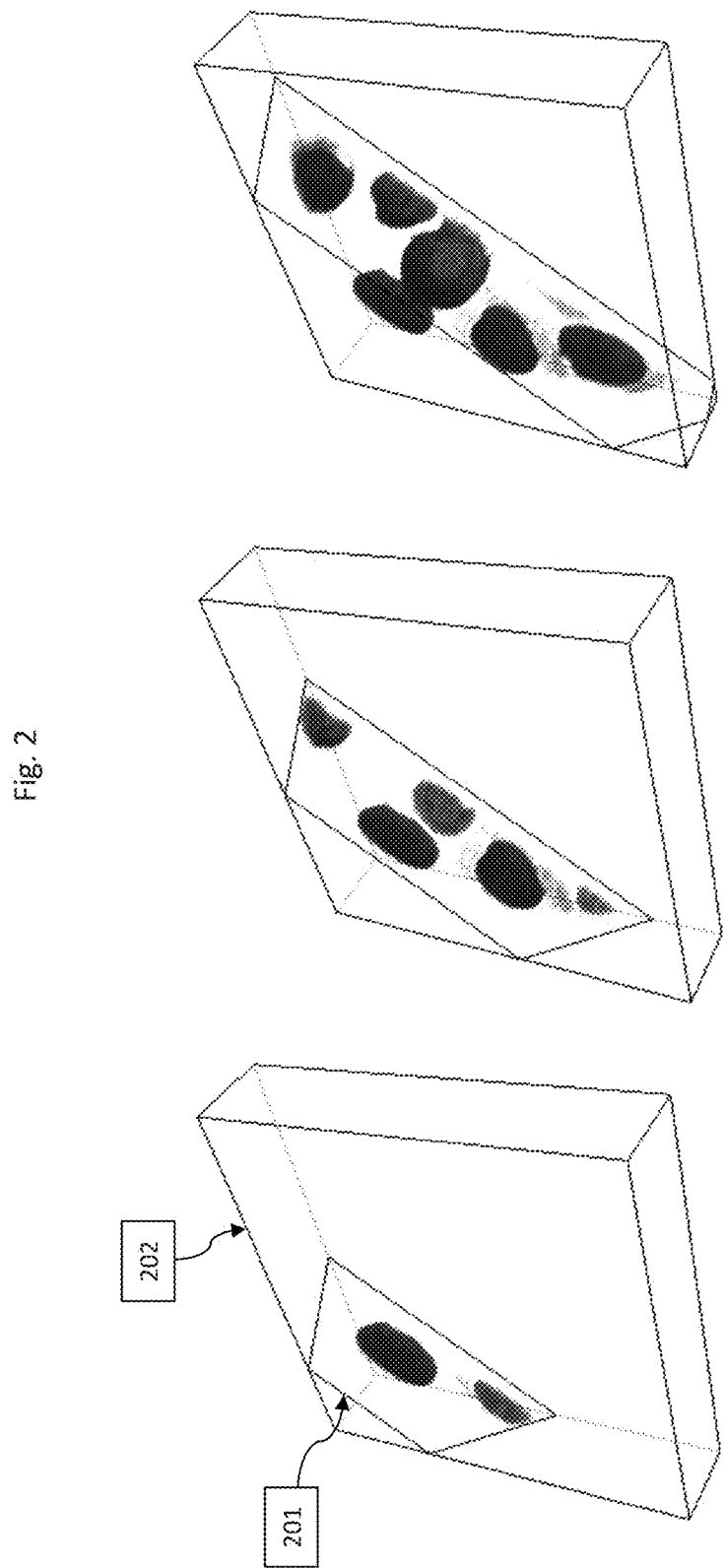

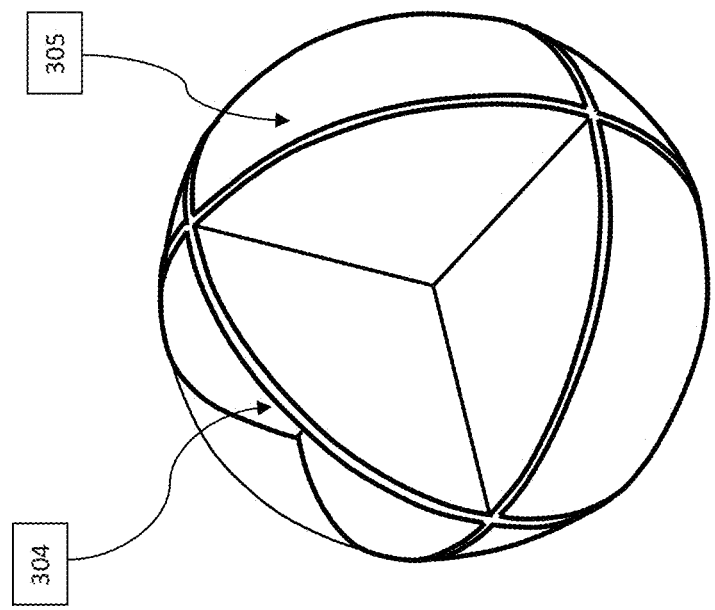
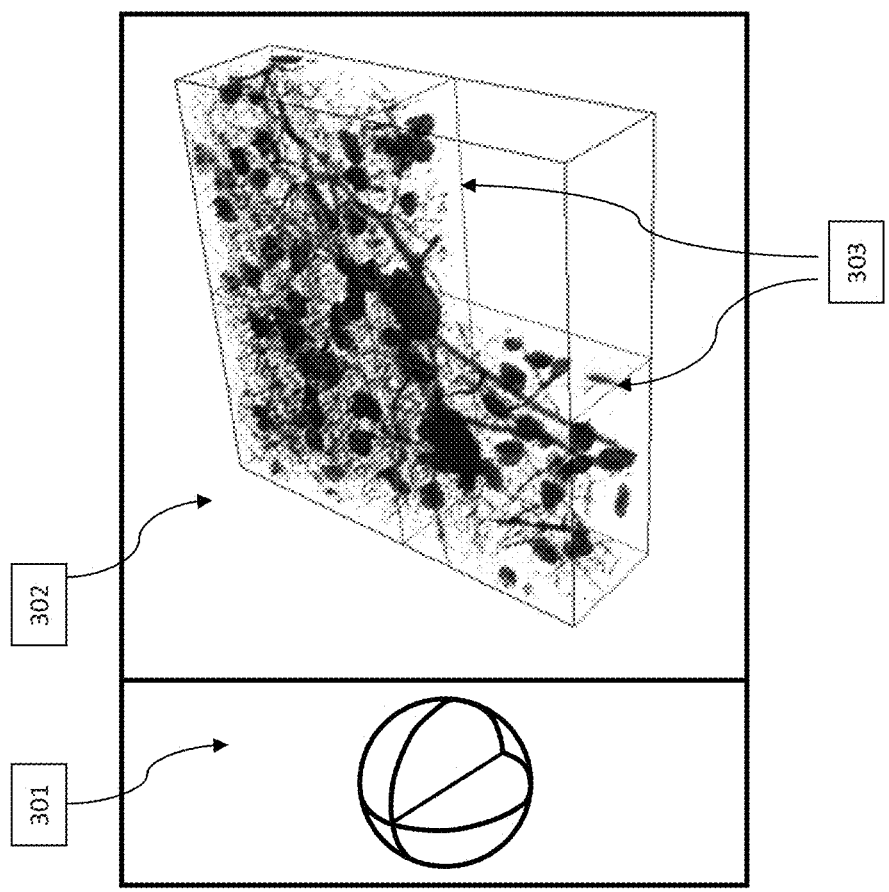

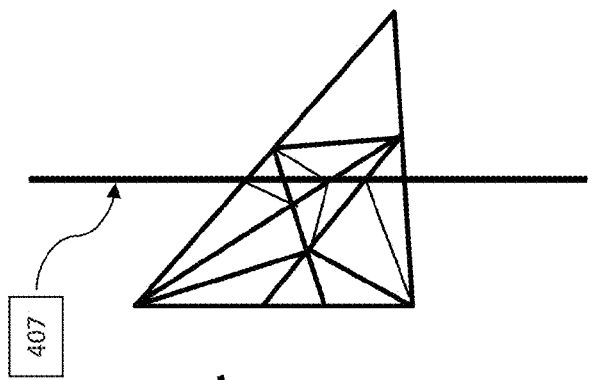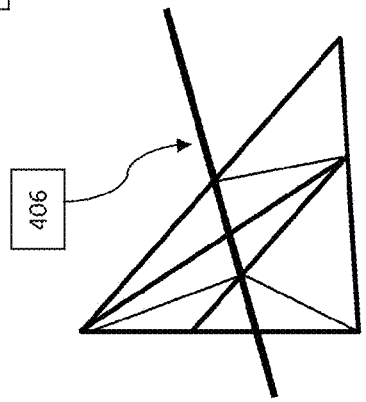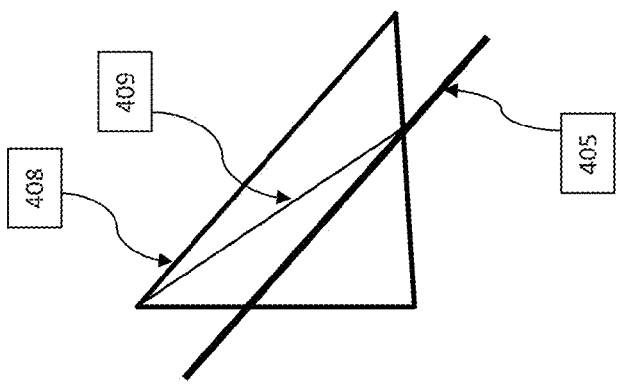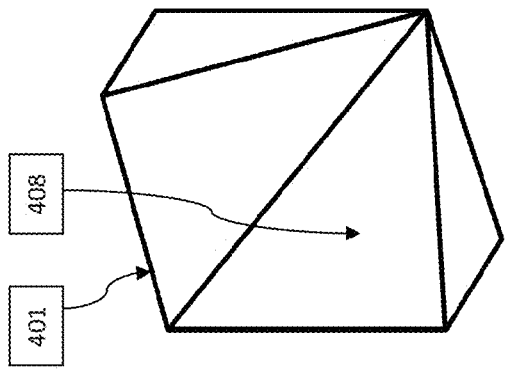

| Index | No. of triangles | First triangle vertices to interpolate | set bit? | Second triangle vertices to interpolate | set bit? | Third triangle vertices to interpolate | set bit? |
|---|---|---|---|---|---|---|---|
| 0 = 000b | 1 | {0, 0}, {1, 1}, {2, 2} | no | - | - | - | - |
| 1 = 001b | 3 | {0, 0}, {0, 1}, {0, 2} | yes | {0, 1}, {1, 1}, {0, 2} | no | {1, 1}, {2, 2}, {0, 2} | no |
| 2 = 010b | 3 | {0, 0}, {0, 1}, {2, 2} | no | {0, 1}, {1, 2}, {2, 2} | no | {0, 1}, {1, 1}, {1, 2} | yes |
| 3 = 011b | 3 | {0, 0}, {1, 1}, {0, 2} | yes | {1, 1}, {1, 2}, {0, 2} | yes | {0, 2}, {1, 2}, {2, 2} | no |
| 4 = 100b | 3 | {0, 0}, {1, 1}, {0, 2} | no | {1, 1}, {1, 2}, {0, 2} | no | {0, 2}, {1, 2}, {2, 2} | yes |
| 5 = 101b | 3 | {0, 0}, {0, 1}, {2, 2} | yes | {0, 1}, {1, 2}, {2, 2} | yes | {0, 1}, {1, 1}, {1, 2} | no |
| 6 = 110b | 3 | {0, 0}, {0, 1}, {0, 2} | no | {0, 1}, {1, 1}, {0, 2} | yes | {1, 1}, {2, 2}, {0, 2} | yes |
| 7 = 111b | 1 | {0, 0}, {1, 1}, {2, 2} | yes | - | - | - | - |

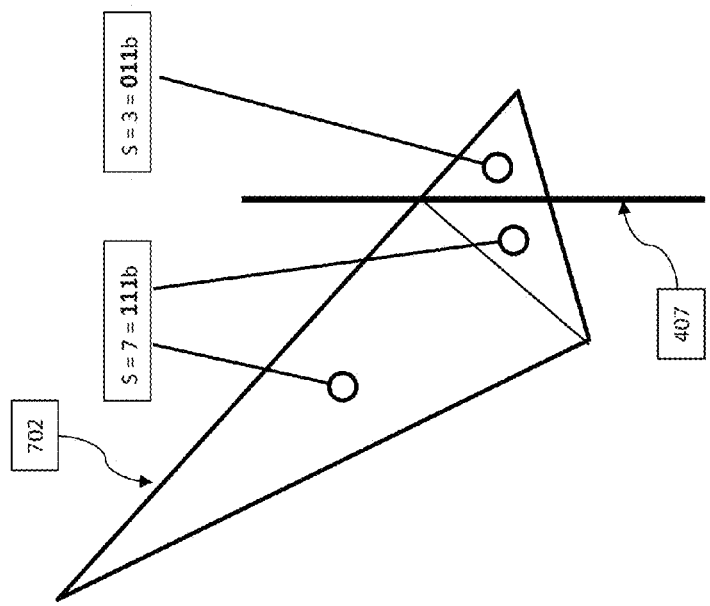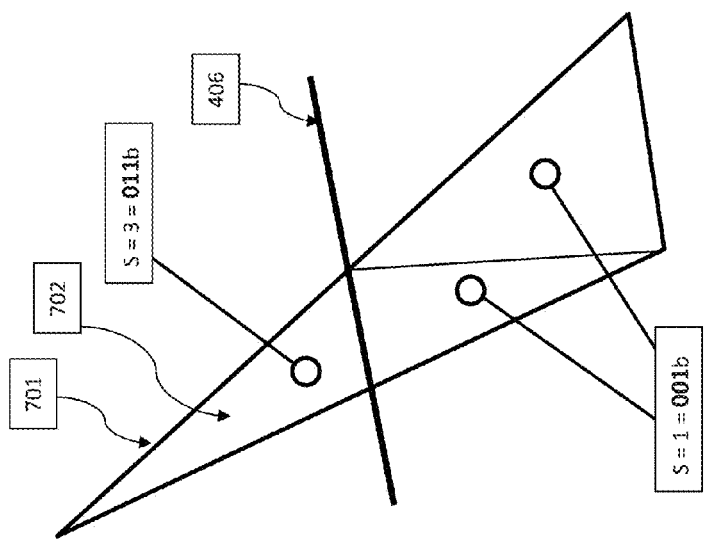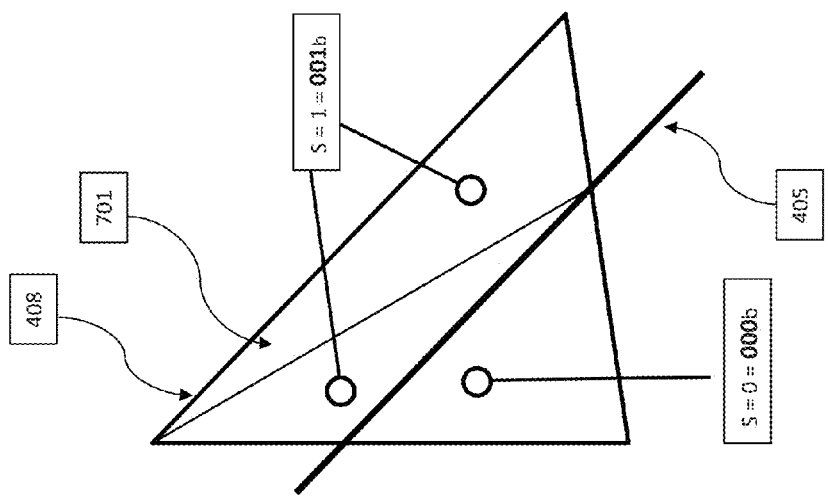

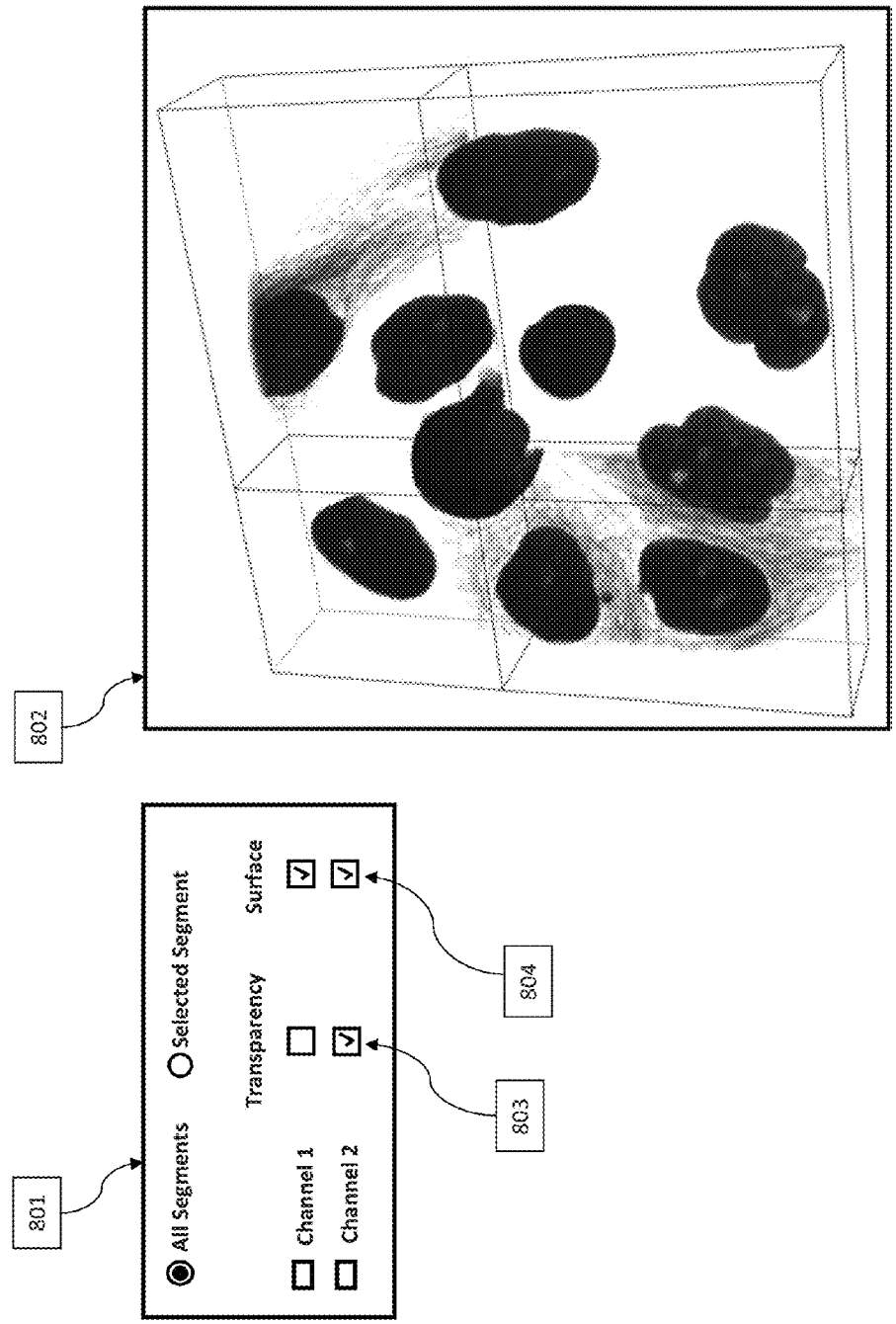

METHOD TO BE CARRIED OUT WHEN OPERATING A MICROSCOPE AND MICROSCOPE

CROSS-REFERENCE TO PRIOR APPLICATIONS

This application is a U.S. National Phase Application under 35 U.S.C. § 371 of International Application No. PCT/EP2013/058179, filed on Apr. 19, 2013, and claims benefit to German Patent Application No. DE 10 2012 009 257.1, filed on May 2, 2012. The International Application was published in German on Nov. 7, 2013 as WO 2013/164208 under PCT Article 21(2).

FIELD

The invention relates to a method for execution upon operation of a microscope and/or for depiction of an object imaged with a microscope or of parts of an object imaged with a microscope.

The invention further relates to a microscope, in particular a scanning microscope and/or laser scanning microscope and/or confocal scanning microscope, for executing the method according to embodiments of the present invention; and to a microscope, in particular a scanning microscope and/or laser scanning microscope and/or confocal scanning microscope, having a display and having means for depicting on a display an object imaged with a microscope or parts of an object imaged with a microscope.

BACKGROUND

It is usual in microscopy to generate image data of an object so that the object can be depicted on a display. Such image data can, for example, contain for each scanned object point an information item regarding the power level of detected light proceeding from that object point and/or regarding the wavelength of the detected light and information regarding the location of the respective object point, for example in the form of coordinate indications.

Three-dimensional scanning of an object is possible, for example, using a confocal microscope.

In scanning microscopy, a sample is illuminated with a light beam in order to observe detected light emitted from the sample as reflected or fluorescent light. The focus of an illumination light beam is moved in a sample plane with the aid of a controllable beam deflection device, generally by tilting two mirrors; the deflection axes are usually perpendicular to one another, so that one mirror deflects in an X direction and the other in a Y direction. Tilting of the mirrors is brought about, for example, with the aid of galvanometer positioning elements. The power level of the detected light coming from the object is measured as a function of the position of the scanning beam. The positioning elements are usually equipped with sensors to ascertain the current mirror position.

In confocal scanning microscopy specifically, an object is scanned in three dimensions with the focus of a light beam. A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illumination light is coupled in via a beam splitter. The fluorescent or reflected light coming from the object travels back via the beam deflection device to the beam splitter, traverses it, and is then focused onto the detection pinhole behind which the detectors are located. This detection arrangement is called a "descan" arrangement. Detected light that does not derive directly from the focus region takes a different light path and does not pass through the detection pinhole, so that what is obtained is only a point information item that results, by sequential scanning of the object with the focus of the illumination light beam, in a three-dimensional image. A three-dimensional image is usually achieved by acquiring image data in layers. Commercial scanning microscopes are usually made up of a scanning module that is flange-mounted onto the stand of a conventional light microscope, the scanning module containing all the aforesaid elements additionally necessary for scanning a sample.

In confocal scanning microscopy, in the case of two-photon excitation (or multi-photon excitation) it is possible to omit a detection pinhole, since the excitation probability depends on the square of the photon density and thus on the square of the illumination intensity, which of course is much higher at the focus than in neighboring regions. The fluorescent light to be detected therefore derives with high probability in very large part from the focus region, which renders superfluous a further differentiation, using a pinhole arrangement, between fluorescence photons from the focus region and fluorescence photons from the neighboring regions.

Three-dimensional imaging, or the generation of image data that can permit three-dimensional depiction of the object, can also be accomplished with other types of microscopes. To be mentioned in this regard merely by way of example is SPIM technology, in which an object is transilluminated with a disk of light from different directions.

Ordinarily, a researcher would like to depict the object in such a way that its aspects that are important to him or her can easily be recognized. The user of a microscope, or the researcher who is evaluating image data obtained using a microscope, therefore needs to influence the manner of depiction, for example the size of the depiction of the object or the direction of view. In addition, especially in the context of a three-dimensional depiction, a need often exists to depict only specific parts of the objects and not other parts. It is often also desirable to be able to look in controlled fashion at a specific section plane of an object.

SUMMARY

In an embodiment, the present invention provides a method for execution upon operation of a microscope or for depiction of an object imaged with the microscope or of a part of the object imaged with the microscope. A proxy of the object is depicted on a display of the microscope or on a further display. At least one manipulation is performed on the proxy, or on the depiction of the proxy, using an input device. At least one depiction parameter for the depiction of the object or of the part of the object, or at least one microscope control parameter, is derived from the manipulation. The object or the part of the object is depicted in consideration of the derived depiction parameter or of the derived microscope control parameter.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. Generally, identically functioning elements are labeled with the same reference characters. The features and advantages of various embodiments of the present invention will become apparent by reading the following detailed description with reference to the attached drawings which illustrate the following:

FIG. 2 schematically illustrates intersection polygons for calculating the depiction of the object which is to be displayed;

FIG. 3 shows a display that displays to the user a proxy and a depiction of the object;

FIG. 7 schematically illustrates the algorithm for the case of three section planes;

FIG. 8 shows an arrangement of control elements displayed to the user, according to an exemplifying embodiment;

DETAILED DESCRIPTION

Figure 1:
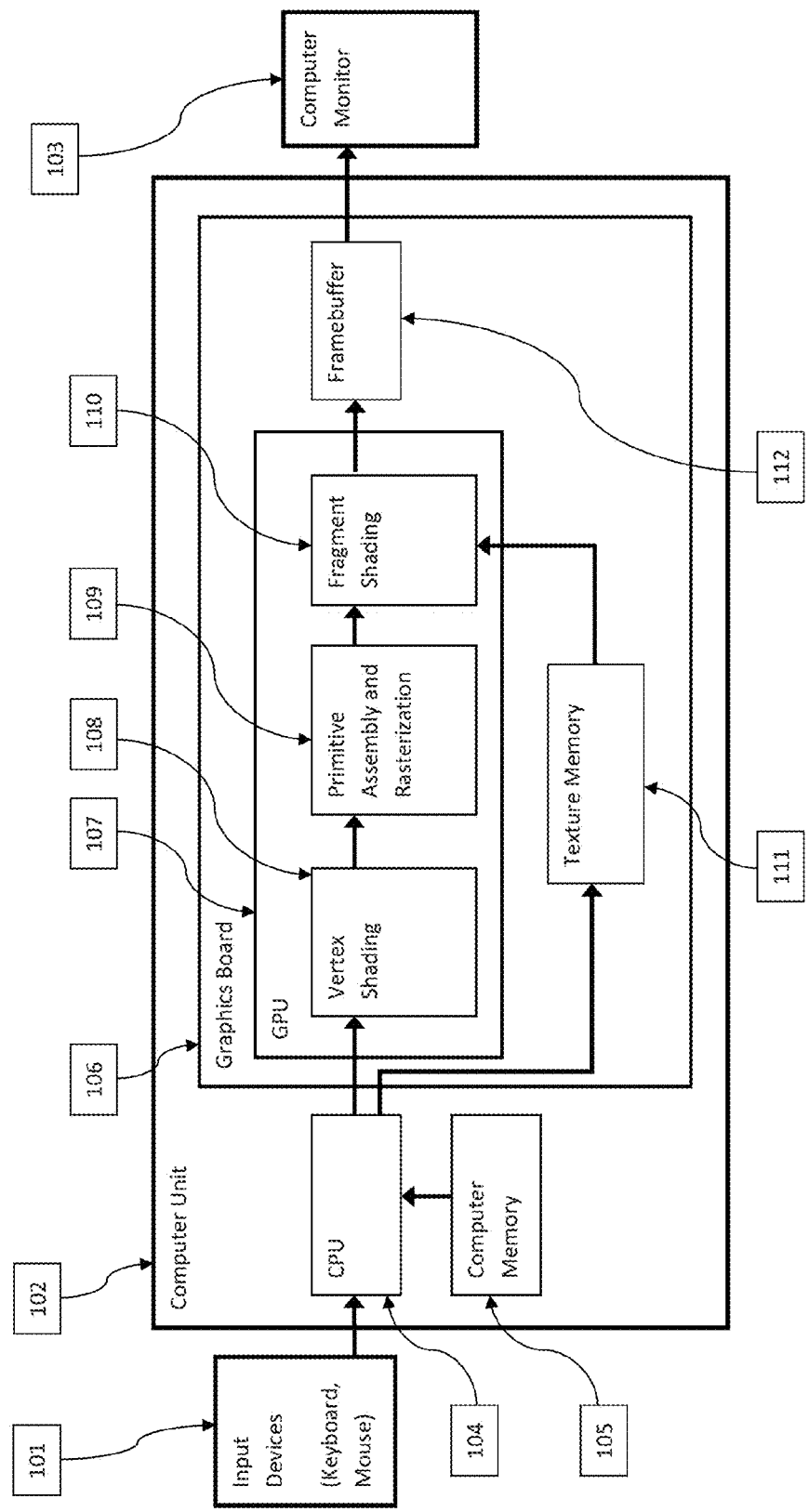
FIG. 1 schematically illustrates the possible constituents of a computer system or a microscope control apparatus for alpha blending usable in the execution of an embodiment of the method according to the present invention.

In an embodiment, the present invention provides a method for execution upon operation of a microscope and/or for depiction of an object imaged with a microscope or of parts of an object imaged with a microscope that enables the user to achieve the desired depiction in a fast and efficient manner, the least possible dependence on the quality of the image data preferably being presupposed.

In one embodiment, the method comprises the following steps:
a. depicting a proxy of the object on the display or on a further display;
b. performing at least one manipulation on the proxy, and/or on the depiction of the proxy, with the aid of an input means;
c. deriving from the manipulation at least one depiction parameter for the depiction of the object or of the part of the object, and/or deriving from the manipulation at least one microscope control parameter;
d. depicting the object or the part of the object in consideration of the derived depiction parameter and/or of the derived microscope control parameter.

Another embodiment of the present invention provides a microscope that enables the user to achieve his or her desired depiction in a fast and efficient manner.

In one embodiment, the microscope comprises:
a. means for depicting a proxy of the object on the display or on a further display;
b. means for performing at least one manipulation on the proxy, and/or on the depiction of the proxy, with the aid of an input means;
c. means for deriving from the manipulation at least one depiction parameter for the depiction of the object or of the part of the object, and/or for deriving from the manipulation at least one microscope control parameter;
d. means for depicting the object or the part of the object in consideration of the derived depiction parameter and/or of the derived microscope control parameter.

An embodiment of the invention has the advantage that the user can quickly and efficiently inform the depicting system, for example a microscope having a computer-controlled display, as to the type of depiction that is desired, and with what boundary conditions. Provision is made here particularly advantageously that a manipulation is performed not on the depiction of the object itself but on at least one, in particular virtual, proxy and/or on its depiction, such that the proxy can in particular be a further object, for example a sphere, that is easily and quickly mentally graspable by the user, even though the actual (for example, biological) object to be depicted can have a substantially more complicated structure, in particular shape. For the user, this substantially improves oversight of what he or she is doing. It especially reduces the risk that the user might lose orientation because of the multiplicity of detailed information regarding the depicted object, and might need to laboriously consider the viewing direction that was just selected or the sub-region that was faded in or out.

Provision can also be made that the proxy corresponds in its three-dimensional shape to an abstraction of the real object, for example a mouse or a brain.

An embodiment of the invention has the first advantage that the proxy has a consistent quality, in particular depiction quality, and thus also enables consistent manipulation of poor-quality real data (e.g. highly noise-affected objects or objects with low contrast).

An embodiment of the invention has the advantage in particular that in the context of conveying his or her desires with regard to depiction, the user is largely not burdened with information that he or she does not in fact need for that operation.

An embodiment of the invention furthermore has the very particular advantage that the desired depiction is achievable even when the image data present at the time do not in fact allow it, since according to a particular embodiment of the method according to the present invention provision can also be made that influence is exerted directly on the image data recovery operation in order to achieve the desired depiction.

In a particular embodiment, provision is made that by means of a manipulation performed on the proxy and/or on its depiction, a change, corresponding to the manipulation, in the depiction of the object is produced in particular automatically. Provision can in particular be advantageously made that the change in the depiction of the object is based on a modification of at least one depiction parameter and/or is based on a modification of at least one microscope control parameter.

Especially with an embodiment of this kind, the user has the advantage that he or she can input the manipulation, for example with the aid of a computer mouse, directly with reference to the proxy or the depiction of the proxy, and that an influence, corresponding to the manipulation, on the depiction of the object occurs, and/or that at least one microscope control parameter is impeded as a result of the manipulation, for example in order to produce a particular depiction of the object or of sub-regions of the object. Provision can be made here, for example, that the user touches the proxy with a depicted mouse pointer, establishes a specific position of the mouse pointer relative to the proxy by clicking a mouse button, and then rotates and/or displaces the proxy by moving the mouse. Provision can be made here that the depiction of the object is simultaneously also rotated and/or displaced in the same manner.

An embodiment in which the proxy is depicted two-dimensionally and the object is depicted three-dimensionally, with a stereoscopic or holographic display, is particularly advantageous. The proxy can be depicted, for example, on a separate two-dimensional display, whereas the object is depicted three-dimensionally using the stereoscopic or holographic display. It is also alternatively possible for the proxy also to be depicted (albeit two-dimensionally) on the stereoscopic or holographic display on which the object is also (three-dimensionally) depicted.

The use of at least one two-dimensional proxy in the context of depictions on three-dimensional stereo monitors can be helpful in particular when the proxy is depicted by a three-dimensional depiction on a two-dimensional screen, and the actual three-dimensional object has its depiction on the stereo monitor.

The aforesaid embodiments have the very particular advantage that the effect of "floating" the mouse pointer over the stereoscopic or holographic proxy is avoided, thereby enabling better and simpler control, in particular three-dimensional control.

It is also possible for the user to mark a sub-region of the proxy, for example by defining section planes, and then to remove from the proxy or the depiction of the proxy a region demarcated by the planes, for example by double-clicking or single-clicking with a mouse button while the mouse pointer is located in that region, with the result that the corresponding region of the depicted object is likewise removed, so that the user has an unobstructed view into the object's interior or of the resulting intersection surfaces.

In a possible embodiment, provision is made that for an offline operating mode, firstly object image data are generated with a microscope, and in an offline operating mode, only depiction parameters for depicting the object or the part of the object are derived from the manipulation.

As already mentioned, provision can also be made, in particular when a desired depiction cannot be generated from previously generated image data, that in an online operating mode of a microscope during ongoing (in particular repeated) scanning of an object, depiction parameters for depicting the object or the part of the object are derived from the manipulation, and/or microscope control parameters are derived from the manipulation. The result of this is that targeted image data for a specific depiction, for example for particular viewing directions and/or particular detail views and/or for particular sectioned depictions, are generated. This occurs preferably automatically and/or in such a way that the user does not need any detailed, microscope-specific technical knowledge. Instead, provision can advantageously be made that corresponding microscope control parameters for a plurality of possible depiction types are stored in a microscope, which parameters can be retrieved as necessary, for example by a control apparatus, and utilized. The particular advantage here is that the user does not even need to know which microscope settings must be made in order to allow the acquisition of image data suitable for a particular depiction.

The proxy is preferably a virtual object. The proxy can in particular be a further multi-dimensional, in particular three-dimensional object, and/or can be part of a further multi-dimensional, in particular three-dimensional object.

Provision can also be made that the proxy is a geometric solid, for example a sphere, a cube, or a cylinder, and/or is part of a geometric solid. The use of an elementary geometric figure has the particular advantage that the user can easily gain an overview, since he or she as a rule knows from experience about elementary geometric figures.

The use of an elementary figure, adapted to the object, as a proxy, i.e. the stylized figure of a mouse or a brain, can contribute to standardizing microscopic depictions and repeating them in uniform fashion.

A further embodiment can be the simultaneous depiction of the proxy within the three-dimensional image, thus enabling better orientation for the user by the fact that he or she observes the abstract elementary figure.

An embodiment in which the proxy comprises a coordinate system that is displayed to the user is particularly easy to operate. Provision can be made in particular that the proxy comprises a coordinate system that is displayed to the user in the form of coordinate axes and/or by the depiction of characteristic planes or surfaces and/or by depiction of the basic planes. An embodiment of this kind makes it easier for the user to assess, for example, the viewing direction that is currently selected and/or the quadrants that, for example, are currently shown or hidden.

Especially with regard to a quickly graspable reproduction of the current settings situation and/or the manipulations currently being performed, provision can advantageously be made that the proxy or the surface of the proxy is depicted as transparent or semi-transparent; or that parts of the proxy are depicted as transparent or semi-transparent. Alternatively or additionally, provision can also be made that the surface of the proxy has a texture and/or characters and/or a pattern and/or a color, and/or that the surface of the proxy has a texture that is modifiable over time or as a function of state, and/or characters that are modifiable over time or as a function of state, and/or a pattern that is modifiable over time or as a function of state, and/or a color that is modifiable over time or as a function of state, and/or a transparency that is modifiable over time or as a function of state.

A suitable manipulation is in principle any one that has an influence on the depiction of the object and/or on the control of the microscope. As already mentioned, a manipulation can in particular contain, for example, a rotation and/or an excision of a sub-region. Provision can also be made that the manipulation contains an excision of the parts that are arranged in one quadrant of a coordinate system of the proxy, and/or that the manipulation contains the addition or modification of one or more section planes. Provision can also be made, for example, that the manipulation contains the excision of a part of the proxy or the excision of a part of the depiction of the proxy. It is also possible in particular for the manipulation to contain a marking of a part of the proxy.

In a particularly advantageous embodiment of the invention, provision is made that a time sequence of individual depictions, which for example can be two-dimensional or three-dimensional, occurs. The depictions can be, for example, a sequence of sectioned images of adjacent object planes. For such a depiction, provision can be made in particular that the manipulation contains the addition or modification of a starting marker, in particular of a starting plane, and of an ending marker, in particular an ending plane, for example for a depiction successively in time of adjacent section planes.

The surfaces selectable by manipulation, for example for a sectioned depiction or for marking a region to be removed from the depiction, can also be curved surfaces.

As already mentioned, provision can advantageously be made that the proxy and/or the depiction of the proxy is adapted in terms of size, color, and contrast to the user's perception capabilities, in particular when a three-dimensional image object is, for example, very noisy. This has the particular advantage that a clear section plane or intersection surface can nevertheless be defined.

In a particular variant, provision is made that a change over time in the section planes or intersection surfaces defined with the aid of the proxy is reproduced as a time-varying depiction of the object.

Provision can also be made in particular that the proxy or its depiction is adapted to the n different channels of a three-dimensional image, in particular in such a way that individualized control of individual channels is made possible, simultaneously or separately in time, by a manipulation of the proxy or of its depiction.

Advantageously, gradients can also easily be adjusted by a manipulation of the proxy or of its depiction, in such a way that a section plane has an adjustable starting and ending point by way of which a profile, e.g. a transparency, can be adjusted.

As also already mentioned, provision can be made that the manipulation contains a modification of the size of the proxy and/or of the depiction of the proxy.

Alternatively or additionally, the manipulation can contain a displacement of the depiction of the proxy on the display or on the further display.

A depiction parameter contains at least one information item that is relevant with regard to the desired depiction. Provision can accordingly be made, for example, that the depiction parameter contains an information item with regard to orientation regarding the depiction of the object. Alternatively or additionally, provision can be made that the depiction parameter contains an information item regarding the size of the depiction of the object or regarding the size of the depiction of a part of the object.

It is also possible for the depiction parameter to contain an information item regarding the external boundary and/or the shape of a part of the object which is to be depicted.

For a particular type of depiction, provision can be made that the depiction parameter contains an information item regarding a time sequence of different depictions and/or of depictions of different parts of the object.

In particular, the depiction parameter can contain an information item regarding the position of the depiction of the object or of a part of the object which is to be depicted.

In an advantageous embodiment, provision is made that a volume rendering method is used for the depiction of the object. Provision can be made in particular that a volume is subdivided into volume segments, and volume segments are selected by the user, and a subset of the data is displayed as a function of that selection of the volume segments. It is also advantageously possible, alternatively or additionally, for different combinations of rendering methods to be used in different volume segments, as a function of the user's selection. In a particular embodiment, the data of different image channels or combinations of image channels are displayed in different volume segments as a function of the user's selection.

The microscope control parameter contains at least one information item that is directly or indirectly relevant to microscopic imaging and/or to the generation of image data of the object.

The microscope control parameter can contain, for example, an information item with regard to at least one object plane that is to be scanned. Provision can also be made that the microscope control parameter contains an information item with regard to at least one sequence of section planes of the object which are to be scanned; and/or that the microscope control parameter contains an information item with regard to the position in time of a focus of an illumination light beam.

Provision can be made in particular that the microscope control parameter contains an information item with regard to scanning speed.

For the depiction of details of an object, for example, provision can advantageously be made that the microscope control parameter contains an information item with regard to a scan accuracy and/or a resolution. Provision can be made, for example, that image data outside a region of particular interest are (in particular, automatically) acquired with a lower resolution than inside said region of interest.

Provision can also be made that the microscope control parameter contains an information item with regard to an object manipulation. Provision can be made, for example, that with a manipulation of the proxy or of the depiction of the proxy, the user triggers a real manipulation of the object, for example photo-bleaching of an area or application of a voltage using microelectrodes.

According to a very particularly advantageous embodiment, depiction of the object or of the part of the object occurs on a stereoscopic display, in which context provision can be made that the user or users wear(s) eyeglasses which ensure that only the information intended for a respective eye is incident into that eye. These can be, for example shutter glasses or polarizing glasses.

Alternatively, it is also possible for depiction of the object or of the part of the object to occur on a holographic display. Provision can be made here that a hologram is calculated from generated image data and is presented to the user on the display. An embodiment of this kind has the very particular advantage that the user does not need to wear eyeglasses. A further advantage that exists is that the user perceives the depicted object at the actual location on which his or her eyes are focused.

The proxy can also be depicted on a stereoscopic or holographic display of this kind. This can be the same display on which the object is also depicted. It is also possible, however, for a further display to be used to depict the proxy.

Provision can be made in principle, independently of the nature of the display, for the object and/or the proxy to be displayed three-dimensionally.

Provision can be made in particular for the object and/or the proxy to be depicted as a hologram, and/or for the object and/or the proxy to be depicted as a stereoscopic image, and/or for the object and/or the proxy to be depicted in perspective in a two-dimensional depiction.

In a very particular embodiment, provision is made that the further display is the display of a portable computer and/or of a laptop and/or of a mobile telephone and/or of a tablet PC. In particular, provision can additionally be made that the manipulation is inputted on and/or with one of the aforementioned devices.

Suitable input means are all devices that make it possible to convey information in terms of the desired depiction to a system for depicting image information and/or to a microscope. Provision can be made in particular that the input means comprises a computer mouse or a touch-sensitive area or a touch-sensitive screen or a motion sensor.

A further input capability is a single finger or multiple fingers of the user in combination with a touchscreen.

The input means can in particular be a wirelessly connected device, for example a laptop or a smartphone. The use of devices that have their own display for depicting the proxy is particularly advantageous.

No limitations exist in principle with regard to the manner of operation of the input means. Provision can be made, for example, that the input means capacitively or inductively senses a touch or a proximity. Provision can also be made that the input means transfers information by radio or by acoustic transfer or by light transfer, for example to a system for depicting image information and/or to a microscope.

In particular, when a sample to be investigated contains multiple relevant objects, provision can particularly advantageously be made that, a further object can be depicted in addition to the object, a further proxy being associated with the further object and the method according to an embodiment of the present invention also being executed with reference to the further object and the further proxy. This makes it possible also to depict in desired fashion structures that are made up of multiple objects.

With regard to the method, provision can be made in particular that a volume rendering, in particular alpha blending, is performed in order to process the image data for the desired depiction of the object.

Provision can be made in particular that the method is executed using a computer and/or a scanning microscope and/or a laser scanning microscope and/or a confocal scanning microscope.

Execution using a computer or with a programmable control apparatus of a microscope, in particular of a confocal microscope, can advantageously be effected with a computer program product that can be loaded directly into the memory of a digital computer and contains software code segments with which the method according to an embodiment of the present invention, in particular at least one of the special embodiments described above, can be executed when the computer product runs on a computer or on the programmable control apparatus of a microscope.

As already explained, a microscope, in particular a scanning microscope and/or laser scanning microscope and/or confocal scanning microscope, can advantageously be used to execute the method.

In a particular embodiment, the microscope according to the present invention is configured in such a way that by means of a manipulation performed on the proxy and/or on its depiction, a change, corresponding to the manipulation, in the depiction of the object is produced in particular automatically by means of a control apparatus, in particular a control computer. Provision can in particular advantageously be made here that the change in the depiction of the object is based on a modification of at least one depiction parameter and/or is based on a modification of at least one microscope control parameter.

The method according to an embodiment of the present invention and/or the microscope according to and embodiment of the present invention, which in particular can be embodied as a scanning microscope and/or laser scanning microscope and/or confocal scanning microscope, can advantageously be used to depict object data, obtained with a different or the same microscope, of an (in particular, biological) object.

Figure 11:
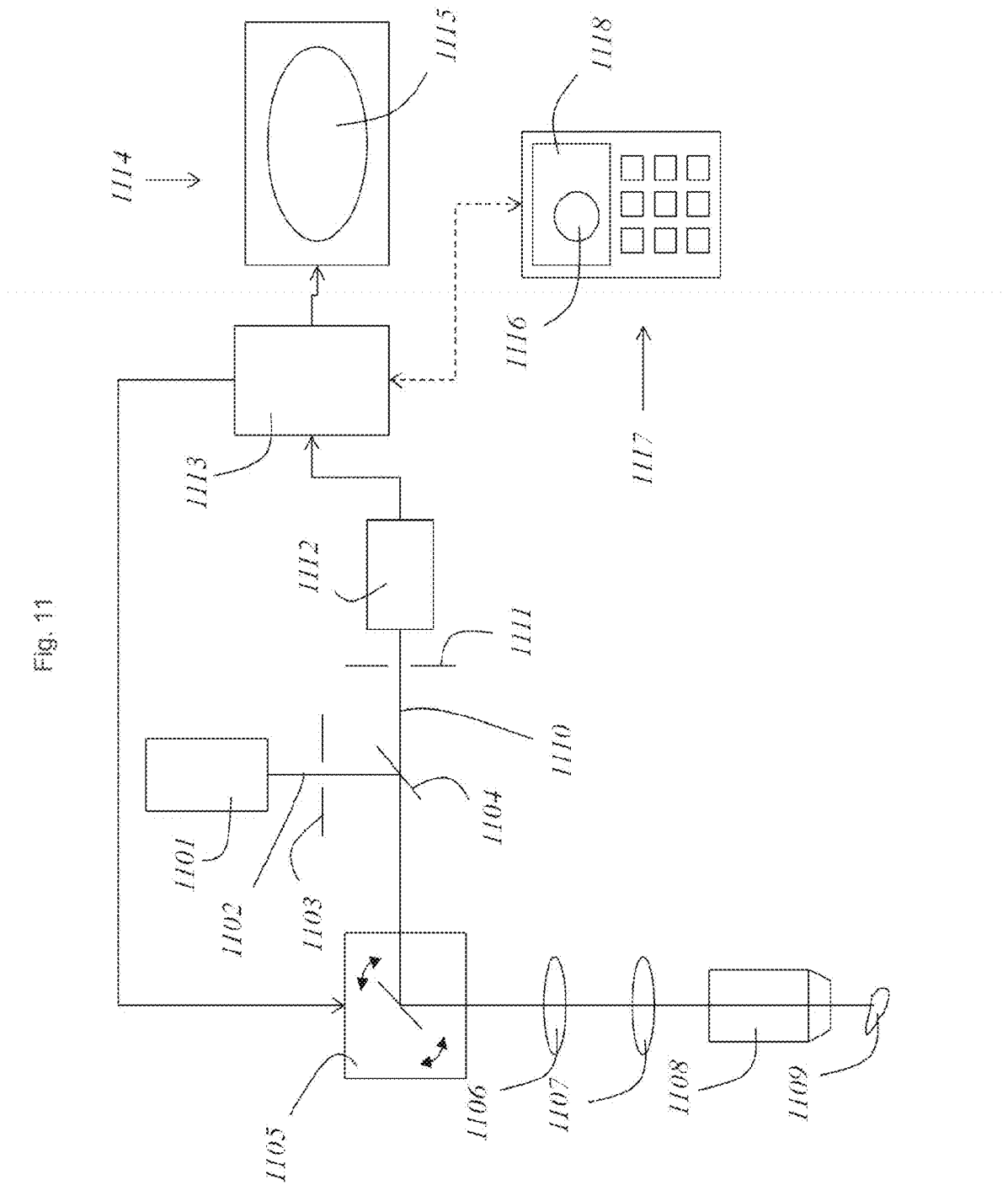
FIG. 11 shows an exemplifying embodiment of a microscope according to the present invention.

FIG. 11 shows an exemplifying embodiment of a microscope according to the present invention that is embodied as a confocal scanning microscope.

The microscope comprises a light source 1101. Illumination ray bundle 1102 generated by light source 1101 passes through illumination aperture 1103 and strikes a dichroic main beam splitter 1104 that deflects the illumination ray bundle to a beam deflection device 1105 that contains a gimbal-mounted scanning mirror. Beam deflection device 1105 guides the focus of illumination ray bundle 1102, via a scanning optical system 1106 and a tube optical system 1107 and objective 1108, over or through object 1109.

Detected light 1110 proceeding from object 1109 travels along the same light path, namely through objective 1108, tube optical system 1107, and scanning optical system 1106 back to beam deflection device 1105, and after passing through main beam deflector 1104 and detection aperture 1111 strikes detection device 1112, which generates electrical signals proportional to the power output of the detected light. The electrical detected signals that are generated are conveyed to a programmable control device 1113 that displays to the user, on a display 1114, a depiction 1115 of object 1109.

A means for displaying a depiction 1116 of a proxy of object 1109, namely a portable computer 1117, is provided, which means comprises a further display 1118 that shows depiction 1116 of the proxy. The proxy is depicted as a sphere, which is evident in particular in FIG. 3. Portable computer 1117 can be embodied, for example, as a smartphone.

Display 1115 of portable computer 1117 is configured as a touch-sensitive display and functions as an input means for performing at least one manipulation on the proxy and/or on the depiction of the proxy. Alternatively or additionally, for example, a mouse can be connected to portable computer 1117.

Control apparatus 1113 wirelessly receives signals having information items with regard to an inputted manipulation, and derives from the manipulation at least one depiction parameter for the depiction of the object or of the part of the object, and/or derives from the manipulation at least one microscope control parameter. For example, control apparatus 1113 can control the beam deflection device in accordance with the manipulation in order to enable a desired depiction, in particular in order to generate image data specifically for a desired depiction. As already mentioned, display 1114 serves inter alia as a means for depicting the object or the part of the object in consideration of the derived depiction parameter and/or of the derived microscope control parameter.

FIG. 3a shows a depiction 301 of a proxy embodied as a sphere, and a depiction 302 of an object. In the case of proxy 301, a segment has been removed by manipulation. The corresponding segment of depiction 302 of the object has correspondingly been removed by the electronic system executing the method, so that the user can see the resulting intersection surfaces and obtain a view into the interior of the object depicted.

A variety of detail aspects for implementing the invention are described below.

Various imaging methods in microscopy generate intensity data as a function of location. These data usually exist in the form of a regular grid for the X, Y, and Z spatial coordinates, which is referred to hereinafter as an "image stack." A volume element within this grid is called a "voxel." The grid arrangement is advantageous but not obligatorily necessary for use of the method according to the present invention. Multiple intensity values, whose data derive from different detectors or from different device settings, can exist at each grid point. They are referred to here as "image channels."

In addition, the data can also exist in the form of a time-variable n-dimensional spatial grid. Dimensions that can also occur in microscopy in addition to X, Y, and Z are, for example:

.t, (1,t) channel, (n,t) channel, spatial data (FLIM, FRAP, FRET), etc.

An embodiment of alpha blending will be firstly be described here as a representative of all volume rendering methods. The method according to the present invention is not limited, however, to the specific embodiment or to alpha blending.

FIG. 1 shows those constituents of a computer system, or of a preferably programmable microscope control apparatus, which are of significance for a typical embodiment of alpha blending: input devices 101, a computer unit 102 having a central processing unit (CPU) 104 and memory 105, a graphics card 106, and a monitor 103. The graphics card contains a graphics processing unit (GPU) 107, a texture memory unit 111, and an image memory 112 whose contents are depicted on monitor 103.

Alpha blending is made up of several calculation steps, some of which are executed on a CPU and others on a GPU. The principal function blocks in GPU 107—vertex shading 108, primitive assembly and rasterization 109, and fragment shading 110—participate in the calculations.

In alpha blending, a three-dimensional texture is generated from the intensity data of the image stack, with a color and transparency value for each voxel. It is usual here to assign to each image channel a color, having a red component Ir, green component Ig, and blue component Ib, that is also selectable by the user. The transparency value $\alpha$ is determined, for example, from the pixel intensity I:

$$\alpha = f(I) = a \ast I \tag{1}$$

where a is a factor that determines the opacity of the depiction and can be selected in channel-dependent fashion by the user. The texture thereby generated is written by CPU 104 into texture memory 111 of graphics card 106.

CPU 104 calculates the coordinates of the vertices of polygons for the intersection surface between planes parallel to the image plane and the delimiting surfaces of the image stack, at various distances from the observer. Floating-point coordinates for the texture memory coordinates of the pertinent vertices of the polygons are additionally calculated. FIG. 2 shows such intersection polygons at decreasing distance from the observer. Delimiting lines 202 of the volume are additionally illustrated.

The intersection polygons are subdivided into triangles. Triangular coordinates and texture coordinates are transferred to vertex shading unit 108, where the triangular coordinates are transformed into the observer coordinate system. The triangles are transferred and processed in order of decreasing distance from the observer.

Transformed triangular coordinates and texture coordinates are then transferred to primitive assembly and rasterization unit 109, where pixel coordinates are assembled for all pixels of the output device that are covered by the respective triangle. The pertinent texture coordinates for each pixel are also interpolated.

Fragment shading unit 110 calculates interpolated intensities and transparency values for the texture coordinates of the respective pixel of the output device from the data in texture memory 111. From the color components R, G, B of frame buffer 112, using the interpolated intensity components Ir, Ig, and Ib and the interpolated transparency value $\alpha$, new color values R', G', and B' are determined and are then written back into frame buffer 112:

$$R' = R \cdot (1-\alpha) + Ir \cdot \alpha$$

$$G' = G \cdot (1-\alpha) + Ig \cdot \alpha$$

$$B' = B \cdot (1-\alpha) + Ib \cdot \alpha \tag{2}$$

The contents of frame buffer 112 are transferred to output device 103.

Section planes can be described in the form of a normalized plane equation $$a \cdot x + b \cdot y + c \cdot z + d = 0 \tag{3}$$

where $$a^2 + b^2 + c^2 = 1.$$

All points having the coordinates (x,y,z) which meet this condition lie in the plane. The coefficients a, b, c, and d determine the location and orientation of the plane. The distance D of an arbitrary point from the plane can be calculated as $$D = a \cdot x + b \cdot y + c \cdot z + d. \tag{4}$$

Points having different values for D lie in different semi-volumes that are separated by the plane. Interfaces such as OpenGL offer the definition of multiple section planes with indication of the coefficients a, b, c, and d. In primitive assembly and rasterization unit 109 of GPU 107, the triangles are cut up in the context of the above-described alpha blending. The result of this operation is from zero to two triangles that are not located in the semi-volume to be cut away. A suitable algorithm for this operation is Sutherland-Hodgman polygon clipping, which will be further discussed later in the text. In a context of multiple section planes, only those components which are not cut away by any of the planes are depicted.

According to one possible embodiment of the method according to the present invention, the following steps (described in detail below) are performed:
define section planes through the total volume,
divide the total volume into volume segments,
select volume segments,
display a subset of the data as a function of this selection of volume segments.

The aforementioned FIG. 3a shows a depiction of proxy 301 and a depiction 302 of the object, in an embodiment of the method for two section planes 303. The depiction of proxy 301 is a computer graphic, and has the same orientation as depiction 302 of the object. This identity of orientation makes possible fast and targeted selection of volume segments that are to be cut away. FIG. 3b is a depiction of proxy 301 for the case of three orthogonal section planes. The location and orientation of the section planes is visualized 304. A mouse click on a spherical segment switches the visibility of the data in the corresponding volume segment.

In a preferred embodiment of the method, initially three section planes, respectively in the XY, XZ, and YZ planes through the center of the volume, are displayed. The section planes are managed in a computer program in the form of the coefficients of a plane equation (4). The display is provided in the form of delimiting lines of the respective plane with the delimiting surfaces of the volume, directly in the projected image. The vertices of the delimiting lines can be generated with the algorithm that is also used to generate the polygons for the alpha blending method described above. FIG. 4a shows an intersection polygon 401 of the alpha blending method and the three section planes 402, 403, 404.

The location and orientation of the section planes can be modified by the user. A displacement is preferably performed by pulling with an input device in the projected image. For changes in orientation, preferably an input device is likewise used, with the aid of a depiction of a special manipulator in the projected image. Other elements, however, for example slide controllers, can also be used. In contrast to the preferred embodiment, a number of section planes other than three can also be used. These section planes can be configured so the user can switch them off. Their initial location can be selected differently. The section planes can also be displayed in different regions of the output device or on different output devices.

For the second step, of dividing the total volume into volume segments, the section planes are numbered from 0 to N−1. $S=2^N$ volume segments are defined. For each volume segment, a number s is defined:

$$S = \sum_{n=0}^{N} Pl(n), \quad (5)$$

where $Pl(n) = 0$ when $Dn < 0$ $Pl(n) = 2^n$ when $Dn \geq 0$.

Figure 5:
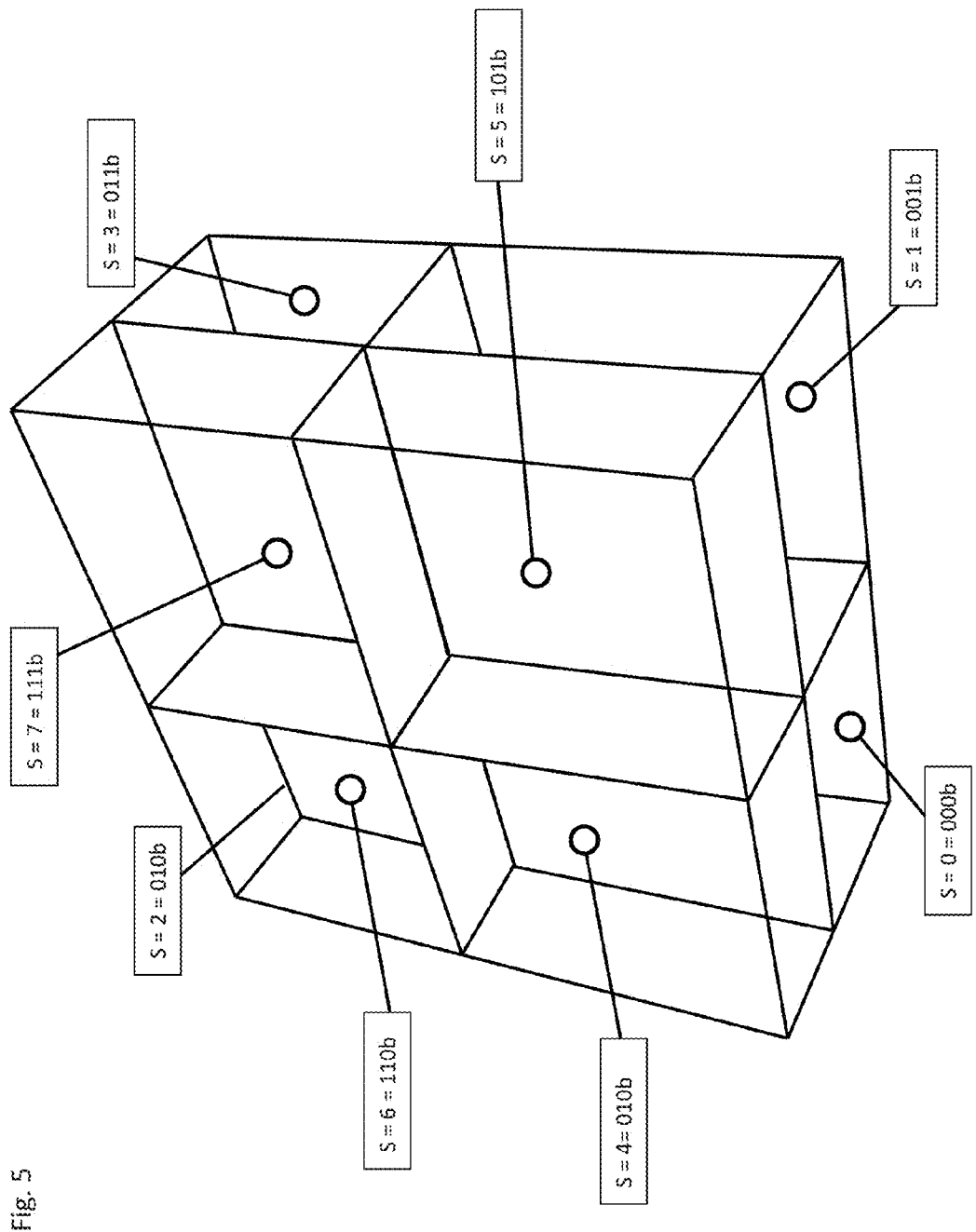
FIG. 5 shows a division into volume segments.

Dn is the distance of points (x, y, z) in the volume segment from the section plane. A bit is therefore set in the volume segment number when the points are at a non-negative distance from the corresponding section plane. FIG. 5 shows one such division with the corresponding numbers s of the volume segments in decimal and binary notation, for the case of three orthogonal section planes.

For the third step, in the preferred embodiment the depiction of the proxy in the form of a sphere is provided alongside the depiction of the object (corresponding to FIG. 3a) in the user interface. The section planes are depicted in the depiction of the section planes. The depiction of the section planes has the same orientation as the depiction of the object. For this, the coordinate transformation used for depicting the proxy can be the same as for depicting the object. Using a computer mouse, the user selects one or more volume segments with a mouse click. This selection is stored by the computer program for each volume segment, based on the number of the volume segment.

The embodiment of the proxy in the form of a sphere is only one possible embodiment. Another advantageous possibility consists in the use of a cuboid having edge length ratios that correspond to the volume being depicted.

As already mentioned, the proxy can also be displayed on a different input or output device. Instead of a computer mouse, a different input device such as a touchpad can be used. In a further embodiment, the coordinate transformation used for the proxy or its depiction can be somewhat different from the one for projection of the volume. It is useful here, for example, to use a parallel projection for the proxy or its depiction, while a perspective presentation is utilized for the projection of the volume. A somewhat different projection direction can also be useful if this provides better orientation due to the arrangement of the input and output devices.

In the last step, the plane equations of the section planes and the information regarding selected volume segments are used to re-project the volume. The method used for this is described with reference to alpha blending. It can also be applied in similar form, however, to other volume rendering methods.

In an advantageous embodiment, the above-described polygons are already processed by the CPU before transfer of the corresponding triangles to vertex shading unit 108 of GPU 107 in order to take into account the section planes that have been defined. Primitive assembly and rasterization unit 109 is not used here to take the section planes into account.

Figure 4B:
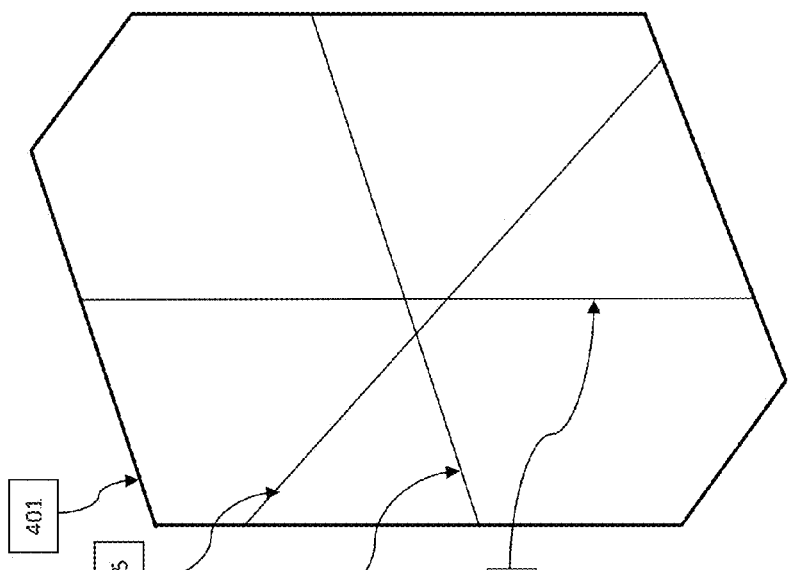
FIG. 4 is a further schematic illustration of intersection polygon calculation.
Figure 4A:
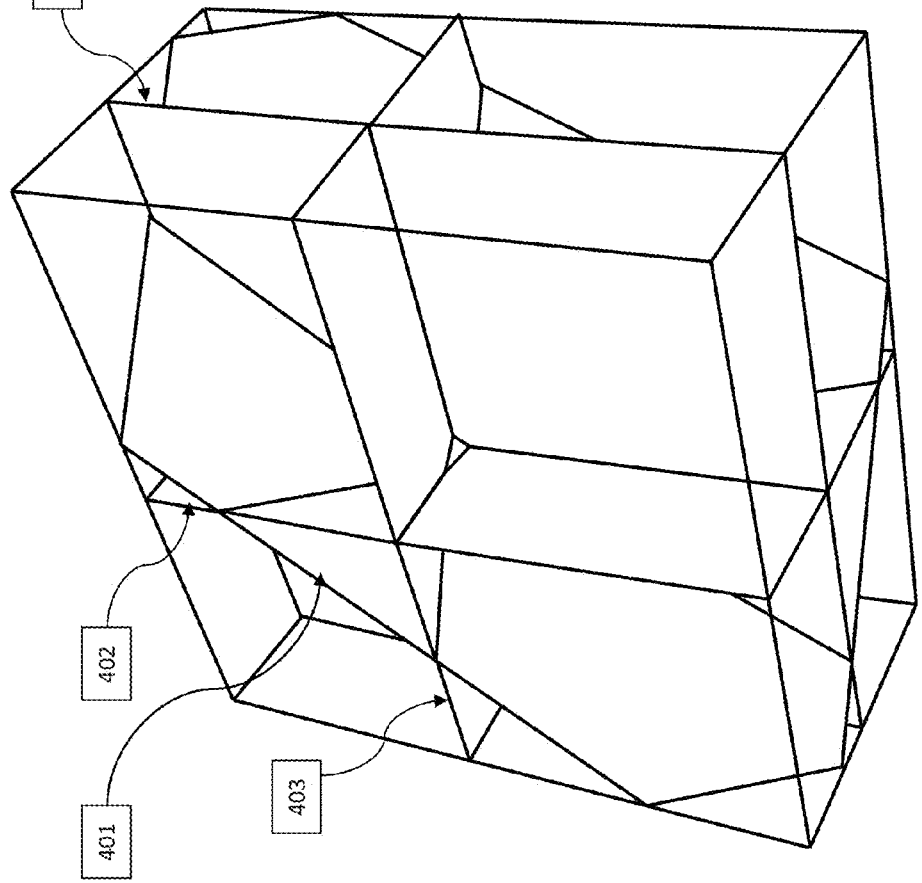

FIG. 4b depicts an intersection polygon 401 and cut lines 405, 406, and 407 of the three section planes 402, 403, and 404 with respect to the polygon. FIG. 4c shows a subdivision of polygon 401 into triangles. The goal is to subdivide the individual triangles into sub-triangles that are each located in only one of the volume segments. In addition, for each sub-triangle a determination must be made as to the volume segment in which it is located. The sub-triangles can then be treated differently, depending on user specifications, for processing on a GPU or multiple GPUs. Triangle 408 is selected as a representative for illustration. In FIG. 4d this triangle is first subdivided into three triangles using first cut line 405. There are two possibilities for selecting triangle edge 409. It can be selected using an angle criterion, or also arbitrarily. Further subdivision is shown in FIG. 4e using second cut line 406, and in FIG. 4f using third cut line 407. The algorithm for triangle subdivision for the preferred embodiment is described below.

In the first step, the first plane equation is used in order to subdivide the triangle into as many as three sub-triangles, none of the sub-triangles being located simultaneously in both semi-volumes.

Figure 6:
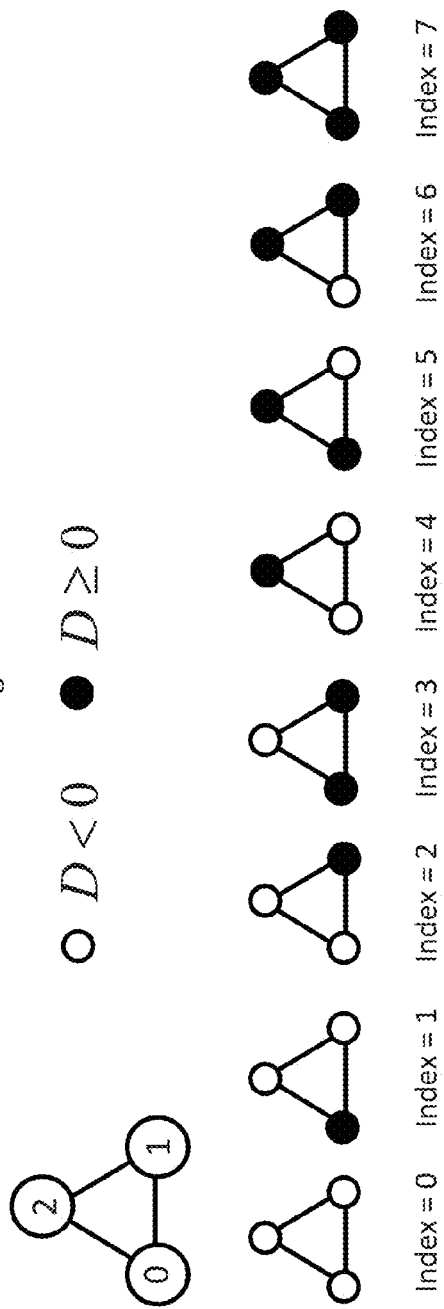
FIG. 6 schematically illustrates the subdivision into triangles and sub-triangles.

In the preferred embodiment, subdivision of a triangle into sub-triangles is accomplished by way of a table that is indicated in FIG. 6. A table index is determined by providing the vertices of the triangle with a number k from 0 to 2 and, for each vertex, setting a bit in the table index when the distance of the vertex from the plane is non-negative. In FIG. 6, a vertex having a non-negative distance is depicted as a solid black circle for all possible cases.

The table contains the information as to how many sub-triangles are occurring, and which vertices k of the original triangle are respectively generating the vertices of the sub-triangles. For each vertex of the sub-triangle there are two numbers for the pertinent vertices of the original triangle. If they are the same number, the point coordinates can then be transferred directly. If the numbers are different, interpolation is necessary.

Interpolation of two vertices $\vec{P}1$ and $\vec{P}2$ is performed by determining the distances D1 and D2 of the points from the section plane and correlating as follows:

$$\vec{P}i = \frac{\vec{P}1 \cdot D2 + \vec{P}2 \cdot D1}{D1 + D2}. \quad (6)$$

The texture coordinates are correlated in the same manner. A subdivision of the triangles thereby obtained is then performed, using the other section planes.

The table also contains columns that indicate whether the new vertex is at a non-negative distance from the section plane. If so, the lowest bit (for the information as to the volume segment in which a sub-triangle is located) is set for the first section plane. This information is completed in further steps with the other section planes. Thus the second bit is set for the second intersection, and so forth. FIGS. 7a to 7c illustrate this algorithm once again for the case of three section planes.

The result is a list of sub-triangles that are equipped with a number that corresponds to the number of the volume segment (5) in which they are located. Depending on the user's selection, those triangles which are located in the segments for which the user has authorized depiction are then transferred, with the pertinent texture coordinates, to vertex shading unit 108 of GPU 107.

The further steps of alpha blending are executed as in the method of the existing art.

The above-described triangle subdivision method is only one of the possible embodiments for this step of the method according to the present invention. Using other information in the table, for example, it is possible to avoid repeated calculation of interpolated coordinates. The Sutherland-Hodgman polygon clipping algorithm is also usable in modified form. The modification is necessary because the vertices cut away from the original shape, and the pertinent triangles, are discarded, but triangles of both sides may continue to be needed depending on the segments selected by the user. A further embodiment uses the Sutherland-Hodgman polygon clipping algorithm twice, by applying different signs for the coefficients in the plane equation each time in order to generate sub-triangles for both semi-volumes.

Modern GPUs additionally possess a geometry shader unit with which a triangle subdivision can be performed on the GPU. The flexibility of GPUs also allows clipping algorithms to be embodied in fragment shader 110. For this, the x, y, and z coordinates can be transferred into the fragment shader unit, where a determination is made, based on the plane equations, as to whether the fragment is visible.

In another advantageous embodiment of the method, a user can decide separately for each individual image channel as to whether the data in selected segments are to be displayed. FIG. 8 shows, for this, an arrangement of control elements 801 and image display 802. Selection is made via switches 803 and 804, for each channel but for all volume segments. A separate selection of different rendering methods for each channel is additionally possible.

Figure 9:
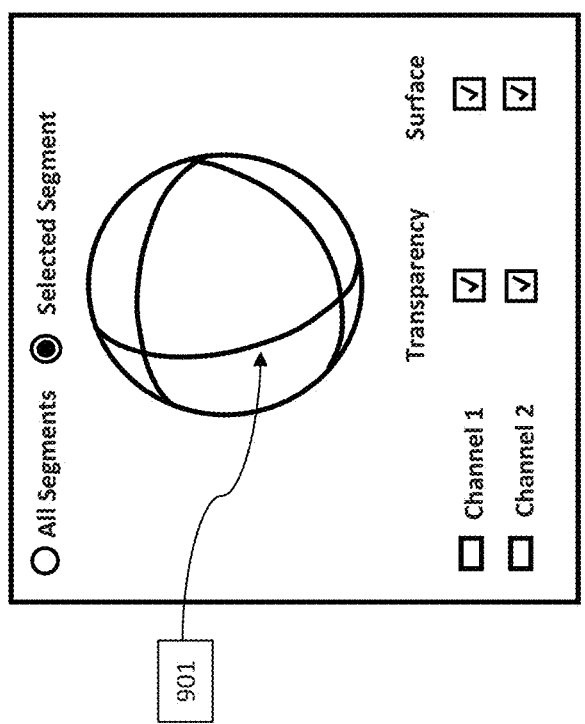
FIG. 9 is an exemplifying embodiment of the depiction of a proxy and of further control elements.
Figure 10:
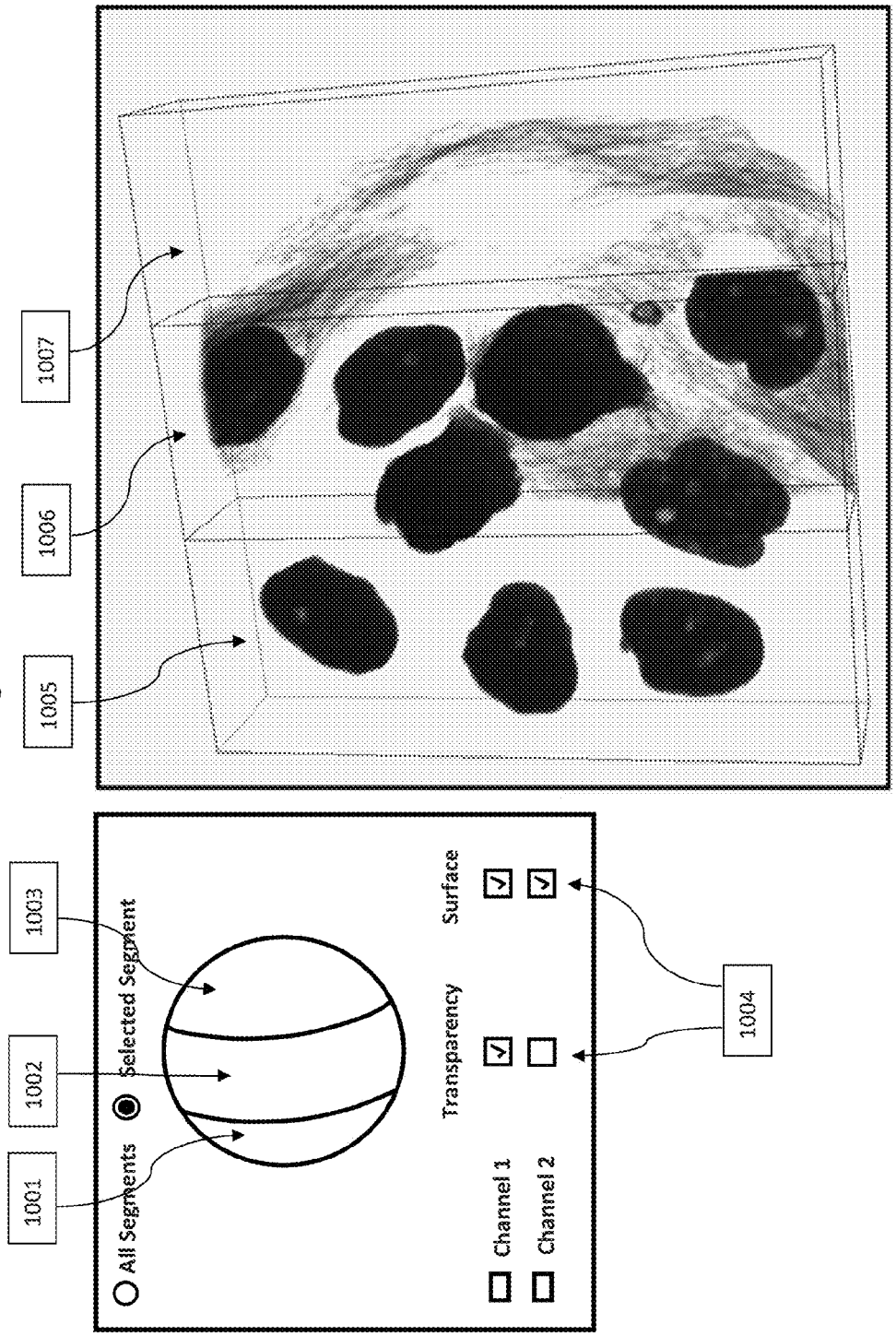
FIG. 10 is an exemplifying embodiment of a proxy and of a depiction of the object which is displayed to the user.

FIG. 9 shows the depiction of a proxy and control elements for a further embodiment, in which selection of the channel to be depicted, and of the rendering method, can be performed for each volume segment. On the sphere, the user selects a volume segment 901 and then performs the settings for that volume segment. Here as well, the sphere has the same orientation as the depicted projected image of the volume data. This selection can be made particularly advantageously, as shown in FIG. 10, for the case of coplanar section planes. On the sphere are volume segments 1001, 1002, and 1003, which are separated by the coplanar section planes. Using switch 1004, the user can then define different settings for volume segments 1005, 1006, and 1007 without losing the overview.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for execution upon operation of a microscope or for depiction of an object imaged with the microscope or of a part of the object imaged with the microscope, the method comprising:
   a. depicting a proxy of the object on a display of the microscope or on a further display and depicting the object on a same or different display, the depiction of the proxy and the depiction of the object having a same orientation and being viewable simultaneously by a user;
   b. performing at least one manipulation on the proxy, or on the depiction of the proxy, using an input device;
   c. deriving from the manipulation at least one of a depiction parameter for the depiction of the object or of the part of the object, or a microscope control parameter; and
   d. depicting the object or the part of the object based on the at least one of the derived depiction parameter or the derived microscope control parameter.

2. The method according to claim 1, wherein:
   a. a manipulation performed on the proxy or on its depiction, a change, corresponding to the manipulation, in the depiction of the object is produced or is produced automatically; or
   b. a manipulation performed on the proxy or on its depiction, a change, corresponding to the manipulation, in the depiction of the object is produced or is produced automatically, the change in the depiction of the object being based on a modification of at least one depiction parameter or being based on a modification of at least one microscope control parameter; or
   c. three-dimensional spatial segments are displayable or hideable by clicking on or otherwise touching the proxy.

3. The method according to claim 1, wherein firstly object image data are generated with a microscope and only the depiction parameter for depicting the object or the part of the object are derived from the manipulation.

4. The method according to claim 1, wherein, in an online operating mode of the microscope during ongoing or repeated scanning of the object, the depiction parameter for depicting the object or the part of the object are derived from the manipulation, or the microscope control parameter are derived from the manipulation.

5. The method according to claim 1, wherein the proxy is at least one of:
   a. a virtual object;
   b. a further multi-dimensional or three-dimensional object, or part of the further multi-dimensional or three-dimensional object;
   c. a geometric solid or part of the geometric solid;
   d. a sphere or part of the sphere; and
   e. an abstraction of the real object having a corresponding three-dimensional shape.

6. The method according to claim 1, wherein the proxy comprises at least one of:
   a. a coordinate system that is displayed to the user; and
   b. a coordinate system that is displayed to the user in the form of coordinate axes or by a depiction of characteristic planes or surfaces or by a depiction of basic planes.

7. The method according to claim 1, wherein the proxy or a surface of the proxy or parts of the proxy is depicted as at least one of:
   a. transparent or semi-transparent;
   b. with a texture or characters or a pattern or a color;
   c. with a texture that is modifiable over time or as a function of state, or characters that are modifiable over time or as a function of state, or a pattern that is modifiable over time or as a function of state, or a color that is modifiable over time or as a function of state; and
   d. with a transparency that is modifiable over time or as a function of state.

8. The method according to claim 1, wherein the manipulation contains at least one of:
   a. a rotation;
   b. an excision of a sub-region;
   c. an excision of parts that are arranged in one quadrant of a coordinate system of the proxy;
   d. an addition or modification of one or more section planes;
   e. an excision of a part of the proxy or an excision of a part of the depiction of the proxy; and
   f. a marking of a part of the proxy;
   g. an addition or modification of a starting marker or of a starting plane, and of an ending marker or an ending plane, for a depiction successively in time of adjacent section planes;
   h. a modification of a size of the proxy or of the depiction of the proxy; and
   i. a displacement of the depiction of the proxy on the display or on the further display.

9. The method according to claim 1, wherein the depiction parameter contains at least one of:
   a. an information item with regard to orientation regarding the depiction of the object;
   b. an information item regarding a size of the depiction of the object or regarding a size of the depiction of the part of the object;
   c. an information item regarding an external boundary or a shape of the part of the object which is to be depicted;
   d. an information item regarding a time sequence of different depictions or of depictions of different parts of the object; and
   e. an information item regarding a position of the depiction of the object or of the part of the object which is to be depicted.

10. The method according to claim 1, wherein a volume rendering method is used for the depiction of the object.

11. The method according to claim 10, wherein a volume is subdivided into volume segments, and the volume segments are selected by the user, and a subset of the data is displayed as a function of the selected volume segments or wherein different combinations of rendering methods are used in different volume segments as a function of the user's selection.

12. The method according to claim 10, wherein the data of different image channels or combinations of image channels are displayed in different volume segments as a function of a selection by a user.

13. The method according to claim 1, wherein the microscope control parameter contains at least one of the following:
   a. an information item with regard to at least one object plane that is to be scanned;
   b. an information item with regard to at least one sequence of section planes of the object which are to be scanned;
   c. an information item with regard to the position in time of a focus of an illumination light beam;
   d. an information item with regard to a scanning speed;
   e. an information item with regard to a scan accuracy and/or a resolution; and
   f. an information item with regard to an object manipulation.

14. The method according to claim 1, wherein at least one of the object and the proxy are displayed at least by one of:
   a. three-dimensionally;
   b. as a hologram;
   c. as a stereoscopic image;
   d. in perspective in a two-dimensional depiction;
   e. the proxy is depicted two-dimensionally, and the object is depicted three-dimensionally using a stereoscopic or holographic display; and
   f. the depiction of the object or of the part of the object or of the proxy occurs on a stereoscopic or holographic display.

15. The method according to claim 1, wherein the further display is at least one of the following:
   the display of a portable computer;
   a laptop;
   a mobile telephone; and
   a tablet PC.

16. The method according to claim 1, wherein the input device comprises a computer mouse or a touch-sensitive area or a touch-sensitive screen or a motion sensor; or the input device operates capacitively; or the input device operates inductively; or the input device transfers information by radio or by acoustic transfer or by light transfer.

17. The method according to claim 1, wherein a further object is depicted in addition to the object, a further proxy being associated with the further object and an analogous method is executed with reference to the further object and the further proxy.

18. The method according to claim 1, wherein the method is executed using at least one of the following: a computer, a scanning microscope, a laser scanning microscope and a confocal scanning microscope.

19. A computer program product loadable directly into a memory of a programmable control apparatus of a microscope or of a digital computer and that contains software code segments with which the method according to claim 1 is executed when the computer program product runs on a computer.

20. A microscope or a scanning microscope or a laser scanning microscope or a confocal scanning microscope configured to execute the method according to claim 1.

21. A microscope or a scanning microscope or a laser scanning microscope or a confocal scanning microscope, having a display and having means for depiction of an object imaged with the microscope, or of a part of the object imaged with the microscope, on the display, the microscope comprising:
   a. means for depicting a proxy of the object on the display or on a further display and for depicting the object on a same or different display, the depiction of the proxy and the depiction of the object having a same orientation and being viewable simultaneously by a user;

b. means for performing at least one manipulation on the proxy, or on the depiction of the proxy, using an input means;
c. means for deriving from the manipulation at least one of a depiction parameter for the depiction of the object or of the part of the object, or a microscope control parameter;
d. means for depicting the object or the part of the object based on the at least one of the derived depiction parameter or the derived microscope control parameter.

22. The microscope according to claim 21, wherein:
a. by means of a manipulation performed on at least one of the proxy and the depiction of the proxy, a change, corresponding to the manipulation, in the depiction of the object is produced or is produced automatically by means of a control apparatus or a control computer; or
b. by means of a manipulation performed on at least one of the proxy and the depiction of the proxy, a change, corresponding to the manipulation, in the depiction of the object is produced or is produced automatically by means of a control apparatus or a control computer, the change in the depiction of the object being based on a modification of at least one depiction parameter or being based on a modification of at least one microscope control parameter.

23. The method according to claim 1, wherein a shape of the depicted proxy is less complicated than a shape of the object and the depicted object.

24. The method according to claim 23, wherein the shape of the depicted proxy is a three-dimensional shape that is an abstraction of the shape of the object.

25. The method according to claim 1, wherein the object is depicted three-dimensionally, and wherein the depiction of the proxy is within the three-dimensional depiction of the object.

26. The method according to claim 1, wherein the object is depicted three-dimensionally, and wherein the proxy or the depiction of the proxy is adapted to n different channels of the three-dimensional depiction of the object in such a way that individualized control of the channels is made possible, simultaneously or separately in time, by a manipulation of the proxy or of the depiction of the proxy.

* * * * *